(12) United States Patent
Sasaoka et al.

(10) Patent No.: US 6,360,046 B1
(45) Date of Patent: Mar. 19, 2002

(54) DISPERSION-SHIFTED OPTICAL FIBER

(75) Inventors: Eisuke Sasaoka; Takatoshi Kato; Akira Urano; Yoshio Yokoyama, all of Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/560,399

(22) Filed: Apr. 28, 2000

Related U.S. Application Data

(63) Continuation-in-part of application No. PCT/JP98/04857, filed on Oct. 27, 1998.

(30) Foreign Application Priority Data

Oct. 27, 1998 (JP) .............................................. 9-297315

(51) Int. Cl.⁷ .............................. G02B 6/02; G02B 6/18
(52) U.S. Cl. ...................... 385/124; 385/142; 385/126
(58) Field of Search .............................. 385/123, 124, 385/126, 127

(56) References Cited

U.S. PATENT DOCUMENTS

| | | | |
|---|---|---|---|
| 5,613,027 A | 3/1997 | Bhagavatula | 385/123 |
| 6,229,946 B1 * | 5/2001 | Sasaoka et al. | 385/123 |
| 6,275,638 B1 * | 8/2001 | Sasaoka et al. | 385/127 |

FOREIGN PATENT DOCUMENTS

| | | |
|---|---|---|
| EP | 0 724 171 A2 | 7/1996 |
| JP | 61-262708 | 11/1986 |
| JP | 63-208005 | 8/1988 |
| JP | 3-44604 | 2/1991 |
| JP | 8-304655 | 11/1996 |
| JP | 9-33744 | 2/1997 |
| JP | 52-38941 | 3/1997 |
| JP | 9-159856 | 6/1997 |

OTHER PUBLICATIONS

Japanese Patent Office, 08–248251, Sep. 27, 1996, 2 pages.

* cited by examiner

*Primary Examiner*—Cassandra Spyrou
*Assistant Examiner*—Alessandro V. Amari

(57) ABSTRACT

The present invention relates to a dispersion-shifted optical fiber which comprises a structure for effectively eliminating the causes of deterioration in characteristics at the making stage thereof and is suitable for wavelength division multiplexing transmission. In the dispersion-shifted optical fiber according to the present invention, impurities to be added and the contents thereof are adjusted so as to reduce viscosity difference at each interface between individual glass regions. As a consequence of this structure, occurrence of structural irregularity and glass defect are effectively restrained in the vicinity of the interfaces between the regions.

14 Claims, 4 Drawing Sheets

DISTANCE FROM CENTER $O_1$

DISTANCE FROM CENTER $O_2$

DISTANCE FROM CENTER $O_3$

DISTANCE FROM CENTER O₄

DISPERSION-SHIFTED OPTICAL FIBER

RELATED APPLICATIONS

This is a Continuation-In-Part application of International Patent application serial No. PCT/JP98/04857 filed on Oct. 27, 1998, now pending.

BACKGROUND OF THE INVENTION

1. Field of the Invention

The present invention relates to a single-mode optical fiber used as a transmission line in optical communications or the like; and, in particular, to a dispersion-shifted optical fiber suitable for wavelength division multiplexing (WDM) transmission.

2. Related Background Art

In recent years, there has been an increasing necessity to reduce nonlinear phenomena (distortions of signal light) which have become remarkable as long-haul transmission has been made possible with the advent of WDM transmission and optical amplifiers. Therefore, for example, Japanese Patent Application Laid-Open Nos. 8-304655 and 9-33744 have proposed dispersion-shifted optical fibers which reduce such nonlinear phenomena and are applicable to WDM transmission.

In these dispersion-shifted optical fibers, a core region surrounded by a cladding region has a ring-shaped core structure comprising an inner core and an outer core provided on the outer periphery of the inner core. The refractive index of the outer core is set higher than that of the inner core. Thus, these dispersion-shifted fibers are designed such that their dispersion slope becomes smaller and their effective area becomes larger, thereby enabling them to be suitable for WDM transmission.

Here, nonlinear optical effects refer to phenomena in which signal light pulses are distorted in proportion to density of light intensity or the like due to nonlinear phenomena such as four-wave mixing (FWM), self-phase modulation (SPM), cross-phase modulation (XPM), and the like, thereby restricting transmission speed or repeater spacing in relay transmission systems.

SUMMARY OF THE INVENTION

Having studied the conventional dispersion-shifted optical fibers, the inventors have found the following problems. Namely, in the conventional dispersion-shifted optical fibers, in order to make the refractive index of the outer core become higher than that of the inner core surrounded thereby, $GeO_2$ is added to the outer core in general. As the addition of $GeO_2$, however, generates thermal expansion difference between the individual regions in each of optical fibers at the time of drawing the optical fibers, and further causes a drastic change of internal stress in each of the optical fibers, structural irregularity and glass defect are likely to occur in the vicinity of the outer core interfaces (including at least the interface between the inner and outer cores and the interface between the cladding region and the outer core). There is a possibility that the above-mentioned structural irregularity and glass defect become a factor behind the increase in optical transmission loss, and thermal expansion difference causes the cracking or the like in an optical fiber preform in the process of making the optical fiber preform.

In order to overcome such a problem at the time of optical fiber drawing, it is an object of the present invention to provide a dispersion-shifted optical fiber which has a structure for effectively eliminating the causes of deterioration in characteristics at the making stage thereof and is suitable for WDM transmission.

In order to overcome the above-mentioned problem, the dispersion-shifted optical fiber according to the present invention is a dispersion-shifted optical fiber comprising a core region extending along a predetermined axis, and a cladding region provided on the outer periphery of the core region, in which dopant to be added and the contents thereof are adjusted so as to reduce viscosity difference and thermal expansion difference in the vicinity of each interface between the individual regions.

More specifically, the core region comprises: an inner core in which the concentration distribution of a refractive index reducing dopant such as fluorine (F) or the like is adjusted such that the refractive index is higher in its peripheral portion than in its center portion; and an outer core which is provided on the outer periphery of the inner core and which contains a refractive index increasing dopant such as germanium oxide ($GeO_2$) or the like. In particular, the outer core comprises, at least, an inner portion in which the refractive index increases from a center of the dispersion-shifted optical fiber toward a periphery thereof, and an outer portion which is provided between the inner portion and the cladding region and in which the refractive index decreases from the center of the dispersion-shifted optical fiber toward the periphery thereof. Namely, the contents of the refractive index increasing dopant contained in the outer core decreases toward the inner core and the cladding region, respectively. Also, in the outer portion of the outer core in the dispersion-shifted optical fiber according to the present invention, the ratio of the amounts of change in relative refractive index difference with respect to the radius of the outer portion is not greater than $1.0\%/\mu m$.

As noted above, when the viscosity difference between the individual regions is made smaller in the vicinity of the interface between the inner and outer cores or the interface between the outer core and the cladding region, drastic changes of internal stress can be suppressed at the time of fiber drawing. As a result, occurrence of structural irregularity and glass defect are restrained in the vicinity of each interface between the individual regions. Further, by making thermal expansion difference between the individual regions lower, a problem such as generation of cracking or the like in an optical fiber preform can be suppressed on the process of making the optical fiber preform.

Here, the inner portion in the outer core refers to the portion which is in contact with the inner core, whereas the outer portion refers to a portion in contact with the cladding region. As a consequence, each of the inner and outer portions can be constituted by one part or at least two parts having different relative refractive index differences with respect to the reference area of the cladding region. An intermediate portion can also be provided between the inner and outer portions. Different refractive index increasing dopants may be added to the respective portions of the outer core.

Namely, the dispersion-shifted optical fiber according to the present invention can be configured such that a first dopant for increasing the refractive index is contained in at least the inner portion of the outer core, whereas a second dopant for reducing the viscosity of the outer core upon melting is contained in at least the outer portion of the outer core.

In the outer core, each of the inner and outer portions can be constituted by a plurality of parts each containing at least one of the first and second dopants. In this case, a refractive index profile which changes stepwise along the radial direction can be realized in the outer core. Such a structure can also restrain the occurrence of structural irregularity and glass defect in the vicinity of each interface between the individual regions at the time of fiber drawing and suppress sudden thermal expansion in the outer core.

Here, as disclosed in Japanese Patent Application Laid-Open No. 8-248251, the above-mentioned effective area $A_{eff}$ is given by the following expression (1):

$$A_{eff} = 2\pi \left( \int_0^\infty E^2 r\, dr \right)^2 / \left( \int_0^\infty E^4 r\, dr \right) \quad (1)$$

where E is the electric field accompanying the propagating light, and r is the radial distance from the center of the core region.

On the other hand, the refractive index profile is represented by the relative refractive index difference $\Delta n_i$ given by the following expression (2):

$$\Delta n_i = (n_i - n_{cd})/n_{cd} \quad (2)$$

where $n_{cd}$ is the average refractive index of the reference area ($SiO_2$) in the cladding region, and $n_i$ is the average refractive index in each part i constituting the core region. Hence, the relative refractive index difference $\Delta n_i$ is expressed with reference to the average refractive index $n_{cd}$ of the reference area in the cladding region. Also, in the specification, the relative refractive index difference is expressed in terms of percentage, and areas having a negative relative refractive index difference indicate those having a lower refractive index than the reference area.

For effectively restraining occurrence of nonlinear optical phenomena, it is preferred that the difference in the refractive index difference $\Delta n_i$ between the maximum value in the outer core and the minimum value in the inner core be 1.0% or more. Also, it is preferred that the maximum refractive index in the outer core is the maximum refractive index in the dispersion-shifted optical fiber, and that the minimum relative refractive index difference in the inner core is the minimum value refractive index difference in the dispersion-shifted optical fiber.

It is preferred that the first dopant to be contained in a desirable portion of the outer core includes at least germanium oxide and that the second dopant includes at least phosphorus. The contents of the second dopant is adjusted such as to decrease from the center of the dispersion-shifted optical fiber toward the periphery thereof.

Also, in the dispersion-shifted optical fiber according to the present invention, the cladding region may have a depressed cladding structure comprising an inner cladding which is provided on the outer periphery of the outer core and which has a predetermined refractive index, and an outer cladding which is provided on the outer periphery of the inner cladding and which has a higher refractive index than the inner cladding. When this cladding structure is employed, the outer cladding acts as the reference area in the cladding region.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1A is a view showing a cross-sectional structure of a first embodiment of the dispersion-shifted optical fiber according to the present invention, whereas

FIG. 2A is a view showing a cross-sectional structure of a second embodiment of the dispersion-shifted optical fiber according to the present invention, whereas

FIG. 3A is a view showing a cross-sectional structure of a third embodiment of the dispersion-shifted optical fiber according to the present invention, whereas FIG. 3 is a refractive index profile of the dispersion-shifted optical fiber of the third embodiment shown in FIG. 3A; and FIG. 4A is a view showing a cross-sectional structure of a fourth embodiment of the dispersion-shifted optical fiber according to the present invention, whereas

DETAILED DESCRIPTION OF THE PREFERRED EMBODIMENTS

In the following, embodiments of the dispersion-shifted optical fiber according to the present invention will be explained with reference to FIGS. 1A to 4B. Among these drawings, constituents identical or equivalent to each other are referred to with numerals or letters identical to each other.

First Embodiment

Figure 1A:
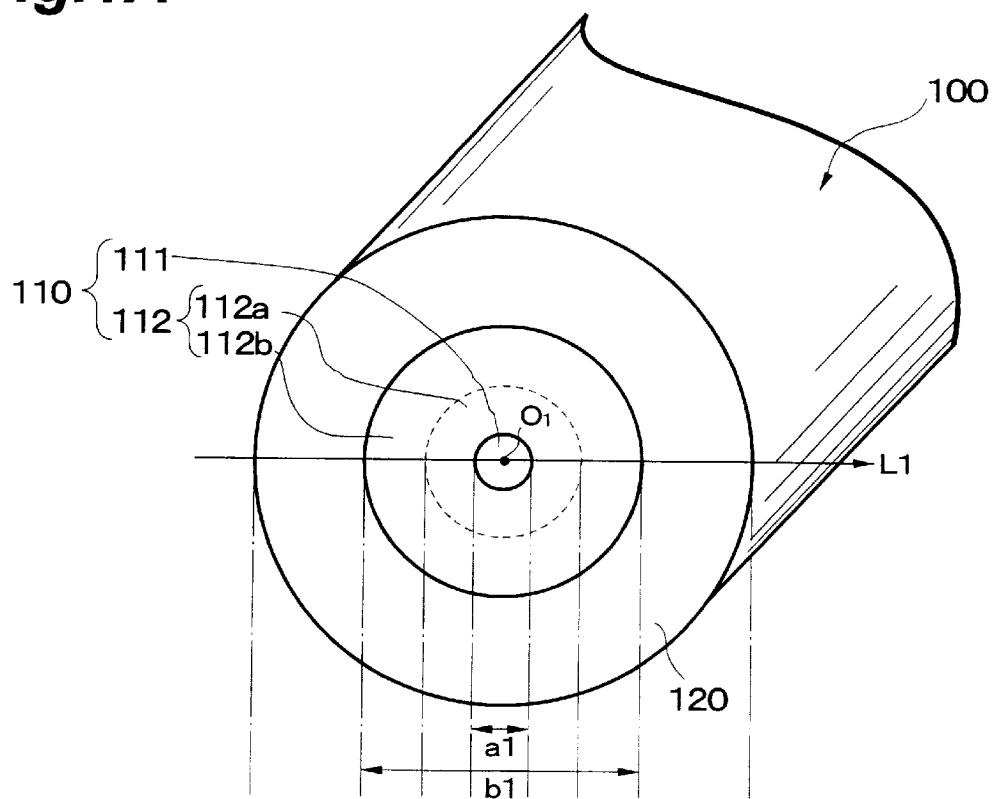

FIG. 1A is a view showing a cross-sectional structure of the fist embodiment of the dispersion-shifted optical fiber according to the present invention.

The dispersion-shifted optical fiber according to the first embodiment is a single-mode optical fiber which guides signal lights in a 1.55-$\mu$m wavelength band, each having a center wavelength $\lambda$ falling within the range of about 1500 to 1600 nm. Also, as shown in FIG. 1A, this dispersion-shifted optical fiber 100 comprises a core region 110 extending along a predetermined axis, and a cladding region 120 provided on the outer periphery of the core region 110, whereas the core region 110 comprises an inner core 111 having an outside diameter a1 (2 $\mu$m) and an outer core 112 having an outside diameter b1 (10 $\mu$m).

The inner core 111 is doped with fluorine as a refractive index reducing dopant, and the contents of fluorine gradually decreases from the center $O_1$ of the dispersion-shifted optical fiber 100 toward the periphery thereof. On the other hand, the outer core 112 is doped with $GeO_2$ as a refractive index increasing dopant. In order to reduce the viscosity difference between the inner core 111 and the outer core 112 in the vicinity of their interface, however, the contents of $GeO_2$ in an inner portion 112a of the outer core 112 gradually increases from the center $O_1$ of the dispersion-shifted optical fiber 100 toward the periphery thereof. On the contrary, in order to reduce the viscosity difference between the cladding region 120 and the outer core 112 in the vicinity of their interface, the contents of $GeO_2$ in an outer portion 112b of the outer core 112 gradually decreases from the center $O_1$ of the dispersion-shifted optical fiber 100 toward the periphery thereof.

Figure 1B:
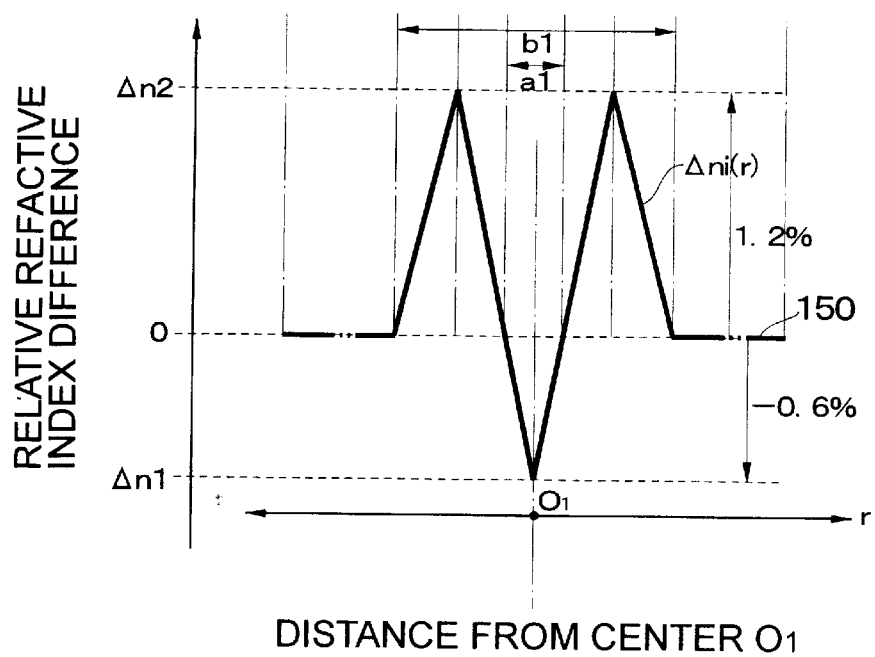
FIG. 1B is a refractive index profile of the dispersion-shifted optical fiber of the first embodiment shown in FIG. 1A.

FIG. 1B is a refractive index profile of the dispersion-shifted optical fiber 100 of the first embodiment shown in FIG. 1A, represented by the relative refractive index difference of each part along the line L1 passing through the center $O_1$ of the dispersion-shifted optical fiber 100. The relative refractive index difference of each glass region is given by the above-mentioned expression (2) with reference to the cladding region 120 as the reference area.

As can be seen from the refractive index profile 150 of FIG. 1B, in the inner core 111 having the outside diameter al (2 $\mu$m), the contents of fluorine is adjusted such that the minimum value $\Delta n_1$ of the relative refractive index difference with respect to the cladding region 120 becomes $-0.6\%$. In the outer core 112 having the outside diameter b1 (10 $\mu$m), the contents of $GeO_2$ is adjusted such that the maximum value $\Delta n_2$ of the relative refractive index difference with respect to the cladding region 120 becomes 1.2%. In the first embodiment, the relative refractive index difference $\Delta n_f(r)$ of the inner portion 112a in the outer core 112 changes from the inner core 111 toward the cladding region 120 at substantially a constant rate of 0.6%/$\mu$m. On the other hand, the relative refractive index difference $\Delta n_f(r)$ of the outer portion 112b in the outer core 112 changes from the inner core 111 toward the cladding region 120 at substantially a constant rate of $-0.6\%$/$\mu$m.

Further, the dispersion-shifted optical fiber 100 according to the first embodiment is designed such that the relative refractive index difference $\Delta n_1$ is the minimum value in the whole optical fiber, the relative refractive index difference $\Delta n_2$ is the maximum value in the whole optical fiber, and the difference between these relative refractive index differences ($\Delta n_2 - \Delta n_1$) becomes 1.0% or more. As a consequence of this configuration, a dispersion-shifted optical fiber having a smaller dispersion slope and a larger effective area is obtained.

Here, in order to realize the dispersion-shifted optical fiber 100 having the structure shown in FIG. 1A, in the process of making a preform which is to be subjected to a drawing process, the contents of $GeO_2$ and fluorine added to the preform are adjusted, and the preform is shaped beforehand such as to attain the structure shown in FIG. 1A after the drawing process. Then, the preform is subjected to the drawing process, so as to form the dispersion-shifted optical fiber 100 having the refractive index profile 150 shown in FIG. 1B, thus completing the method of making thereof.

It has been confirmed that the dispersion-shifted optical fiber 100 according to the first embodiment exhibits a very low transmission loss of 0.22 dB/km with respect to signal light at a wavelength of 1550 nm. Also obtained as characteristics at a wavelength of 1550 nm are a dispersion value of 2.5 ps/nm/km, a dispersion slope of 0.085 ps/$nm^2$/km, and an effective area $A_{eff}$ of 80 $\mu m^2$, thus yielding evaluation results suitable for WDM transmission.

Also, since thermal expansion difference in the vicinity of interfaces between the individual regions has been reduced, no cracking or the like has occurred at all in the process of making the optical fiber preform. Further, in the process of making the dispersion-shifted optical fiber 100 by drawing the preform, since viscosity difference has been reduced in the vicinity of the interfaces of the outer core 112 (including, at least, the interface between the inner core 111 and outer core 112 and the interface between the cladding region 120 and outer core 112), drastic changes of internal stress are suppressed. As a result, structural irregularity and glass defect have effectively been suppressed in the vicinity of the interfaces of the outer core 112.

Second Embodiment

Figure 2A:
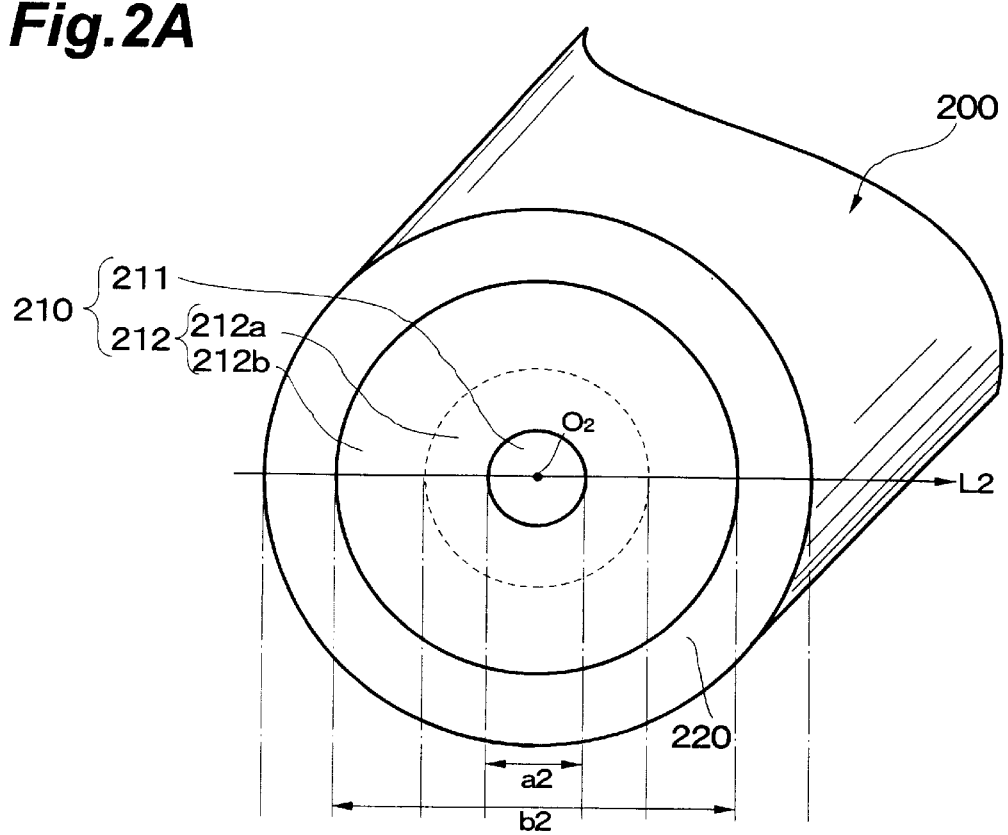

FIG. 2A is a view showing a cross-sectional structure of the second embodiment of the dispersion-shifted optical fiber according to the present invention.

The dispersion-shifted optical fiber according to the second embodiment is a single-mode optical fiber which guides signal lights in a 1.55-$\mu$m wavelength band, each having a center wavelength $\lambda$ falling within the range of about 1500 to 1600 nm. Also, as shown in FIG. 2A, this dispersion-shifted optical fiber 200 comprises a core region 210 extending along a predetermined axis, and a cladding region 220 provided on the outer periphery of the core region 210, whereas the core region 210 comprises an inner core 211 having an outside diameter a2 (2 $\mu$m) and an outer core 212 having an outside diameter b2 (10 $\mu$m).

The inner core 211 is doped with fluorine as a refractive index reducing dopant, and the contents of fluorine gradually decreases from the center $O_2$ of the dispersion-shifted optical fiber 200 toward the periphery thereof. On the other hand, the outer core 212 is doped with $GeO_2$ as a refractive index increasing dopant. In order to reduce the viscosity difference between the inner core 211 and the outer core 212 in the vicinity of their interface, however, the contents of $GeO_2$ in an inner portion 212a of the outer core 212 gradually increases from the center $O_2$ of the dispersion-shifted optical fiber 200 toward the periphery thereof. On the contrary, in order to reduce the viscosity difference between the cladding region 220 and the outer core 212 in the vicinity of their interface, the contents of $GeO_2$ in an outer portion 212b of the outer core 212 gradually decreases from the center $O_2$ of the dispersion-shifted optical fiber 200 toward the periphery thereof.

In the second embodiment, each of the inner core 211 and outer core 212 is constituted by a plurality of parts having refractive indexes different from each other, thus realizing a step-like refractive index profile.

Figure 2B:
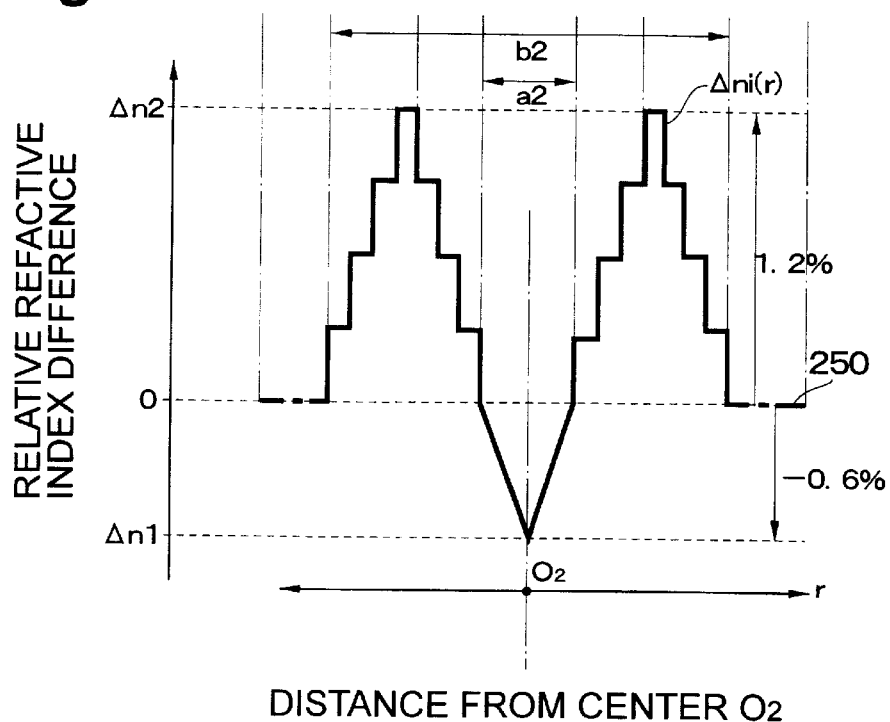
FIG. 2B is a refractive index profile of the dispersion-shifted optical fiber of the second embodiment shown in FIG. 2A.

FIG. 2B is a refractive index profile of the dispersion-shifted optical fiber 200 of the second embodiment shown in FIG. 2A, represented by the relative refractive index difference of each part along the line L2 passing through the center $O_2$ of the dispersion-shifted optical fiber 200. The relative refractive index difference of each glass region is given by the above-mentioned expression (2) with reference to the cladding region 220 as the reference area.

As can be seen from the refractive index profile 250 of FIG. 2B, in the inner core 211 having the outside diameter a2 (2 $\mu$m), the contents of fluorine is adjusted such that the minimum value $\Delta n_1$ of the relative refractive index difference with respect to the cladding region 220 becomes $-0.6\%$. In the outer core 212 having the outside diameter b2 (10 $\mu$m), the contents of $GeO_2$ is adjusted such that the maximum value $\Delta n_2$ of the relative refractive index difference with respect to the cladding region 220 becomes 1.2%. In the second embodiment, the inner portion 212a of the outer core 212 is constituted by a plurality of parts having refractive indexes different from each other such that its relative refractive index difference $\Delta n_f(r)$ changes stepwise along the radial direction, with a rate of change of 0.5%/$\mu$m in the radial direction. On the other hand, the outer portion 212b of the outer core 212 is constituted by a plurality of parts having refractive indexes different from each other such that its relative refractive index difference $\Delta n_r(r)$ changes stepwise along the radial direction. The rate of change in the outer portion 212b in the radial direction is $-0.3\%/\mu m$.

Further, the dispersion-shifted optical fiber 200 according to the second embodiment is designed such that the relative refractive index difference $\Delta n_1$ is the minimum value in the whole optical fiber, the relative refractive index difference $\Delta n_2$ is the maximum value in the whole optical fiber, and the difference between these relative refractive index differences ($\Delta n_2 - \Delta n_1$) becomes 1.0% or more. As a consequence of this configuration, a dispersion-shifted optical fiber having a smaller dispersion slope and a larger effective area is obtained.

Here, in order to realize the dispersion-shifted optical fiber 200 having the structure shown in FIG. 2A, in the process of making a preform which is to be subjected to a drawing process, the contents of $GeO_2$ and fluorine added to the preform are adjusted, and the preform is shaped beforehand such as to attain the structure shown in FIG. 2A after the drawing process. Then, the preform is subjected to the drawing process, so as to form the dispersion-shifted optical fiber 200 having the refractive index profile 250 shown in FIG. 2B, thus completing the method of making thereof.

It has been confirmed that the dispersion-shifted optical fiber 200 according to the second embodiment exhibits a very low transmission loss of 0.22 dB/km with respect to signal light at a wavelength of 1550 nm. Also obtained as characteristics at a wavelength of 1550 nm are a dispersion value of 2.0 ps/nm/km, a dispersion slope of 0.090 ps/nm$^2$/km, and an effective area $A_{eff}$ of 80 $\mu m^2$, thus yielding evaluation results suitable for WDM transmission.

Also, since thermal expansion difference in the vicinity of interfaces between the individual regions has been reduced, no cracking or the like has occurred at all in the process of making the optical fiber preform. Further, in the process of making the dispersion-shifted optical fiber 200 by drawing the preform, since the viscosity difference has been reduced in the vicinity of the interfaces of the outer core 212, drastic changes of internal stress are suppressed. As a result, structural irregularity and glass defect have effectively been suppressed in the vicinity of the interfaces of the outer core 212.

Further, when the refractive index profile of the outer core 212 is shaped into a step-like form as mentioned above, it becomes easier to automatically control manufacturing conditions in the manufacturing step, thus allowing the rate of change of relative refractive index difference to be optimally controlled with a high accuracy. As a consequence, a homogenous dispersion-shifted optical fiber exhibiting a good reproducibility is obtained.

Third Embodiment

Figure 3A:
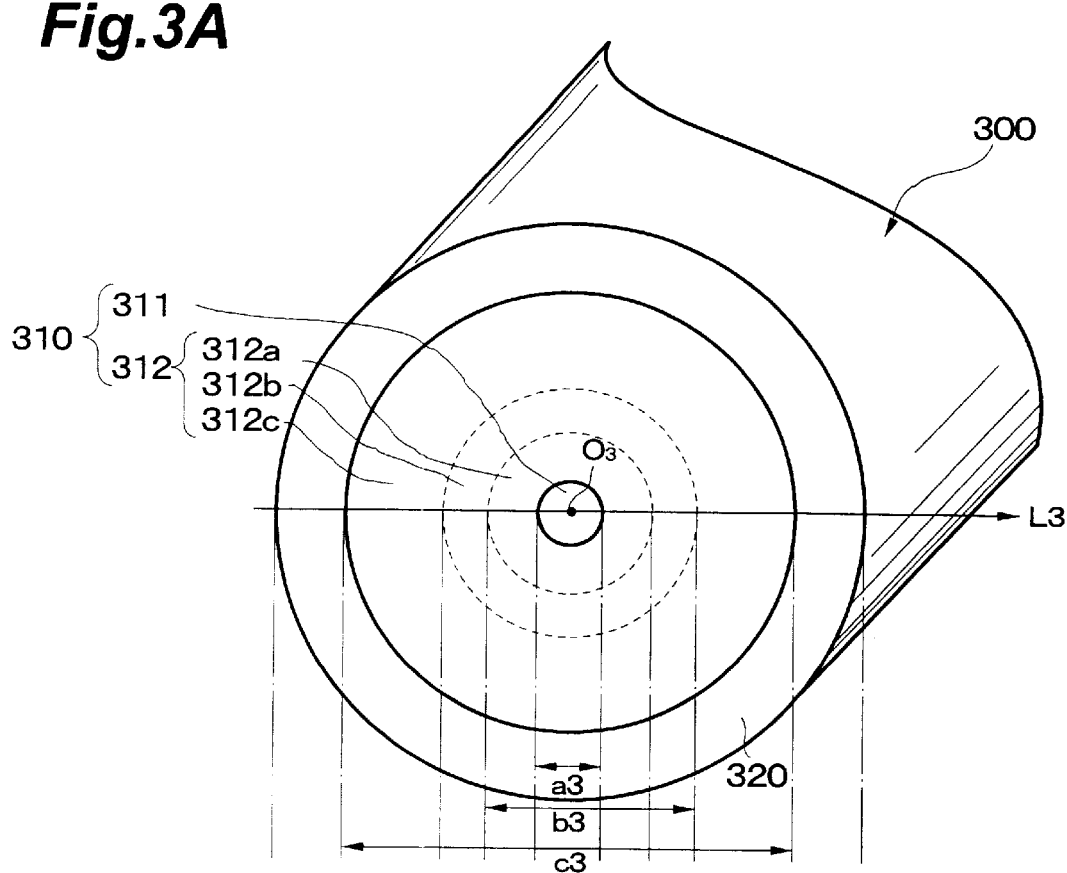

FIG. 3A is a view showing a cross-sectional structure of the third embodiment of the dispersion-shifted optical fiber according to the present invention.

The dispersion-shifted optical fiber according to the third embodiment is a single-mode optical fiber which guides signal lights in a 1.55-$\mu m$ wavelength band, each having a center wavelength $\lambda$ falling within the range of about 1500 to 1600 nm. Also, as shown in FIG. 3A, this dispersion-shifted optical fiber 300 comprises a core region 310 extending along a predetermined axis, and a cladding region 320 provided on the outer periphery of the core region 310, whereas the core region 310 comprises an inner core 311 having an outside diameter a3 (2 $\mu m$) and an outer core 312 having an outside diameter c3 (10 $\mu m$).

The third embodiment is characterized in that, in the outer core 312, an intermediate portion 312b having an outside diameter b3 (8 $\mu m$) is provided between an inner portion 312a adjacent to the inner core 311 and an outer portion 312c adjacent to the cladding region 320, whereas the individual portions of the outer core 312 are respectively contains different dopants. Namely, the inner core 311 is doped with fluorine as a refractive index reducing dopant, and the contents of fluorine gradually decreases from the center $O_3$ of the dispersion-shifted optical fiber 300 toward the periphery thereof. On the other hand, predetermined parts of the outer core 312 are respectively doped with $GeO_2$ and phosphorus as refractive index increasing dopants. In order to reduce the viscosity difference between the inner core 311 and the outer core 312 in the vicinity of their interface, however, the contents of $GeO_2$ in the inner portion 312a of the outer core 312 gradually increases from the center $O_3$ of the dispersion-shifted optical fiber 300 toward the periphery thereof. By contrast, in order to reduce the viscosity difference between the cladding region 320 and the outer core 312 in the vicinity of their interface, the outer portion 312c of the outer core 312 is doped with phosphorus, and the contents of phosphorus gradually decreases from the center $O_3$ of the dispersion-shifted optical fiber 300 toward the periphery thereof. Since the intermediate portion 312b having the outside diameter b3 (8 $\mu m$), which is provided between the inner portion 312a and the outer portion 312c, is not susceptible to the inconveniences in the vicinity of the interfaces of the outer core 312, it is doped with $GeO_2$ substantially uniformly.

Figure 3B:
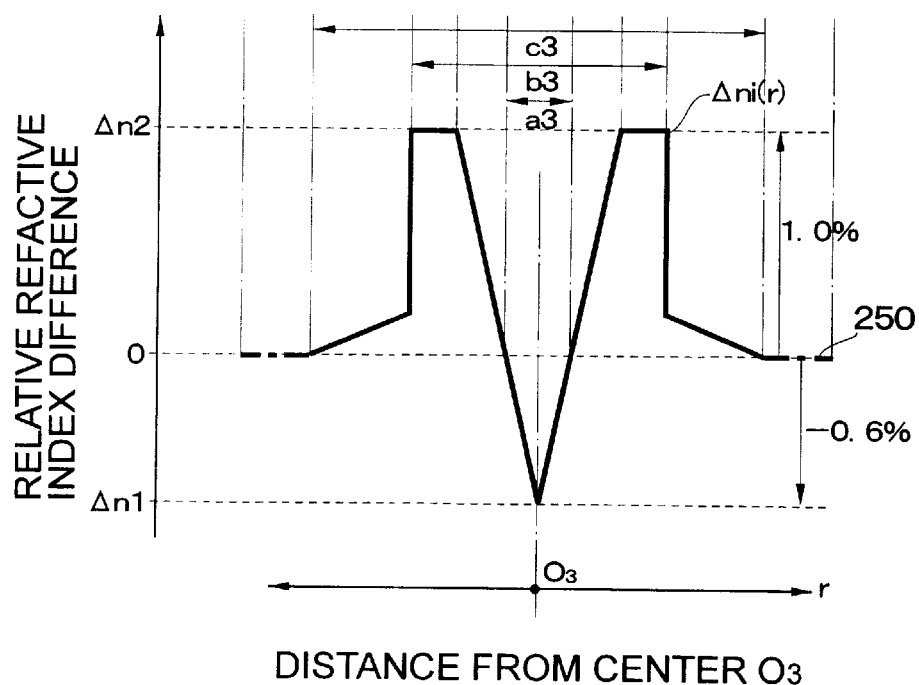

FIG. 3B is a refractive index profile of the dispersion-shifted optical fiber 300 of the third embodiment shown in FIG. 3A, represented by the relative refractive index difference of each part along the line L3 passing through the center $O_3$ of the dispersion-shifted optical fiber 300. The relative refractive index difference of each glass region is given by the above-mentioned expression (2) with reference to the cladding region 320 as the reference area.

As can be seen from the refractive index profile 350 of FIG. 3B, in the inner core 311 having the outside diameter a3 (2 $\mu m$), the contents of fluorine is adjusted such that the minimum value $\Delta n_1$ of the relative refractive index difference with respect to the cladding region 320 becomes $-0.6\%$. In the outer core 312 having the outside diameter c3 (10 $\mu m$), the contents of $GeO_2$ in the inner portion 312a is adjusted such that the relative refractive index difference $\Delta n_r(r)$ increases from the inner core 311 toward the cladding region 320. The intermediate portion 312b having the outside diameter b3 (8 $\mu m$) is substantially uniformly doped with $GeO_2$ such that the relative refractive index difference $\Delta n_2$ with respect to the cladding region 320 becomes 1.0%. The outside portion 312c having the outside diameter c3 (10 $\mu m$) is doped with phosphorus, and the contents of phosphorus is adjusted such as to gradually decrease from the inner core 311 toward the cladding region 320.

Further, the dispersion-shifted optical fiber 300 according to the third embodiment is designed such that the relative refractive index difference $\Delta n_1$ is the minimum value in the whole optical fiber, the relative refractive index difference $\Delta n_2$ is the maximum value in the whole optical fiber, and the difference between these relative refractive index differences ($\Delta n_2 - \Delta n_1$) becomes 1.0% or more. As a consequence of this configuration, a dispersion-shifted optical fiber having a smaller dispersion slope and a larger effective area is obtained.

Here, in order to realize the dispersion-shifted optical fiber 300 having the structure shown in FIG. 3A, in the process of making a preform which is to be subjected to a drawing process, the contents of $GeO_2$, fluorine, and phosphorus added to the preform are adjusted, and the preform is shaped beforehand such as to attain the structure shown in FIG. 3A after the drawing process. Then, the preform is subjected to the drawing process, so as to form the dispersion-shifted optical fiber 300 having the refractive index profile 350 shown in FIG. 3B, thus completing the method of making thereof.

It has been confirmed that the dispersion-shifted optical fiber 300 according to the third embodiment exhibits a very low transmission loss of 0.22 dB/km with respect to signal light at a wavelength of 1550 nm. Also obtained as characteristics at a wavelength of 1550 nm are a dispersion value of 2.5 ps/nm/km, a dispersion slope of 0.090 ps/nm$^2$/km, and an effective area $A_{eff}$ of 80 $\mu$m$^2$, thus yielding evaluation results suitable for WDM transmission.

Also, since thermal expansion difference in the vicinity of interfaces between the individual regions, no cracking or the like has occurred at all in the process of making the optical fiber preform. Further, in the process of making the dispersion-shifted optical fiber 300 by drawing the preform, since the viscosity difference has been reduced in the vicinity of the interfaces of the outer core 312, drastic changes of internal stress are suppressed. As a result, structural irregularity and glass defect have effectively been suppressed in the vicinity of the interfaces of the outer core 312.

Fourth Embodiment

Figure 4A:
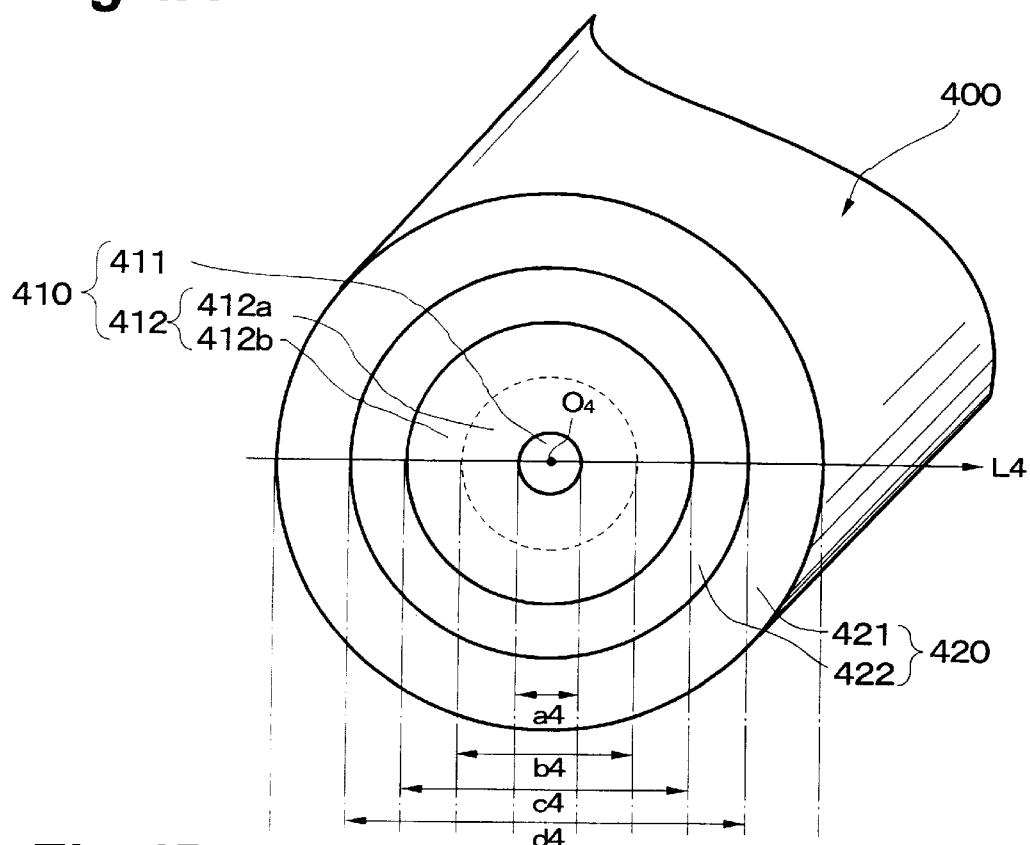

FIG. 4A is a view showing a cross-sectional structure of the fourth embodiment of the dispersion-shifted optical fiber according to the present invention.

The dispersion-shifted optical fiber according to the fourth embodiment is a single-mode optical fiber which guides signal lights in a 1.55-$\mu$m wavelength band, each having a center wavelength $\lambda$ falling within the range of about 1500 to 1600 nm. Also, as shown in FIG. 4A, this dispersion-shifted optical fiber 400 comprises a core region 410 extending along a predetermined axis, and a cladding region 420 provided on the outer periphery of the core region 410, whereas the core region 410 comprises an inner core 411 having an outside diameter a4 (2.6 $\mu$m) and an outer core 412 having an outside diameter c4 (9.8 $\mu$m). On the other hand, the cladding region 420 has a depressed cladding structure comprising an inner cladding 421 having an outside diameter d4 (13.9 $\mu$m), and an outer cladding 422 provided on the outer periphery of the inner cladding 421.

The inner core 411 is doped with fluorine as a refractive index reducing dopant, and the contents of fluorine is substantially constant in the vicinity of the center $O_4$ of the dispersion-shifted optical fiber 400 but gradually decreases toward the periphery thereof. On the other hand, the outer core 412 is doped with $GeO_2$ as a refractive index increasing dopant. In particular, in order to reduce the viscosity difference between the inner core 411 and the outer core 412 in the vicinity of their interface, the contents of $GeO_2$ in an inner portion 412a of the outer core 412 gradually increases from the center $O_4$ of the dispersion-shifted optical fiber 400 toward the periphery thereof. On the contrary, in order to reduce the viscosity difference between the cladding region 420 and the outer core 412 in the vicinity of their interface, the contents of $GeO_2$ in an outer portion 412b of the outer core 412 gradually decreases from the center $O_4$ of the dispersion-shifted optical fiber 400 toward the periphery thereof. Further, the inner cladding 421 of the cladding region 420 is substantially uniformly doped with fluorine as a refractive index lowering agent.

Figure 4B:
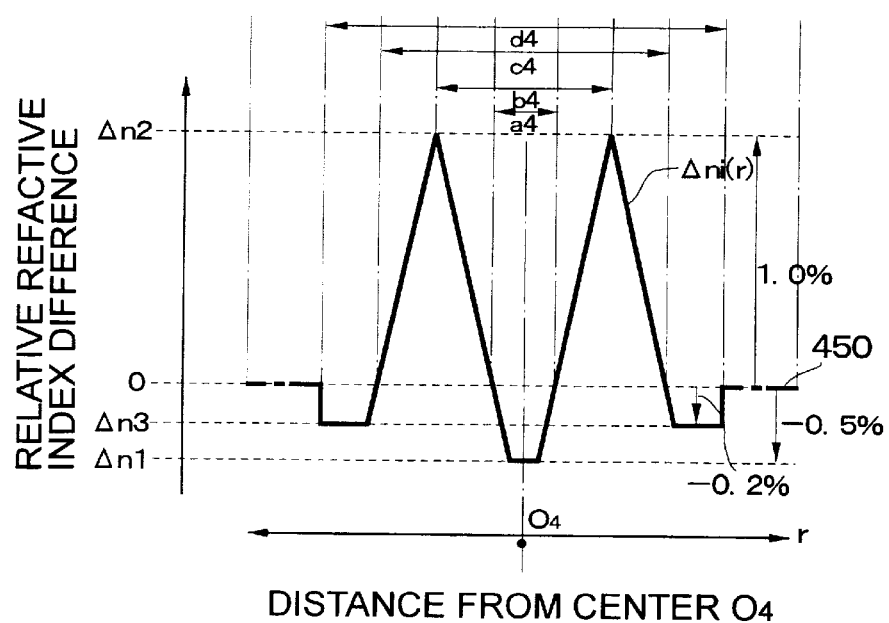
FIG. 4B is a refractive index profile of the dispersion-shifted optical fiber of the fourth embodiment shown in FIG. 4A.

FIG. 4B is a refractive index profile of the dispersion-shifted optical fiber 400 of the fourth embodiment shown in FIG. 4A, represented by the relative refractive index difference of each part along the line L4 passing through the center $O_4$ of the dispersion-shifted optical fiber 400. The relative refractive index difference of each glass region is given by the above-mentioned expression (2) with reference to the outer cladding 422 of the cladding region 420 as the reference area. Also, the dispersion-shifted optical fiber 400 is designed such that viscosity difference becomes smaller in the vicinity of each interface between the individual glass regions.

As can be seen from the refractive index profile 450 of FIG. 4B, in the inner core 411 having the outside diameter a4 (2.6 $\mu$m), the contents of fluorine is adjusted such that the minimum value $\Delta n_1$ of the relative refractive index difference with respect to the outer cladding 422 becomes −0.5%. In the outer core 412 having the outside diameter c4 (9.8 $\mu$m), the contents of $GeO_2$ is adjusted such that the maximum value $\Delta n_2$ of the relative refractive index difference with respect to the outer cladding 422 becomes 1.0%. The inner cladding 421 having the outside diameter d4 (13.9 $\mu$m) is substantially uniformly doped with $GeO_2$ such that the relative refractive index difference with respect to the outer cladding 422 becomes −0.2%.

In the fourth embodiment, the relative refractive index difference $\Delta n_i(r)$ of the inner portion 412a in the outer core 412 changes from the inner core 411 toward the outer cladding 422 at substantially a constant rate of 0.8%/$\mu$m. On the other hand, the relative refractive index difference $\Delta n_i(r)$ of the outer portion 412b in the outer core 412 changes from the inner core 411 toward the outer cladding 422 at substantially a constant rate of −0.7%/$\mu$m.

Further, the dispersion-shifted optical fiber 400 according to the fourth embodiment is designed such that the relative refractive index difference $\Delta n_1$ is the minimum value in the whole optical fiber, the relative refractive index difference $\Delta n_2$ is the maximum value in the whole optical fiber, and the difference between these relative refractive index differences ($\Delta n_2 - \Delta n_1$) becomes 1.0% or more. As a consequence of this configuration, a dispersion-shifted optical fiber having a smaller dispersion slope and a larger effective area is obtained.

Here, in order to realize the dispersion-shifted optical fiber 400 having the structure shown in FIG. 4A, in the process of making a preform which is to be subjected to a drawing process, the contents of $GeO_2$ and fluorine added to the preform are adjusted, and the preform is shaped beforehand such as to attain the structure shown in FIG. 4A after the drawing process. Then, the preform is subjected to the drawing process, so as to form the dispersion-shifted optical fiber 400 having the refractive index profile 450 shown in FIG. 4B, thus completing the method of making thereof.

It has been confirmed that the dispersion-shifted optical fiber 400 according to the fourth embodiment exhibits a very low transmission loss of 0.21 dB/km with respect to signal light at a wavelength of 1550 nm. Also obtained as characteristics at a wavelength of 1550 nm are a dispersion value of 2.5 ps/nm/km and an effective area $A_{eff}$ of 81 $\mu$m$^2$, thus yielding evaluation results suitable for WDM transmission.

Also, since thermal expansion difference in the vicinity of interfaces between the individual regions has been reduced, no cracking or the like has occurred at all in the process of making the optical fiber preform. Further, in the process of making the dispersion-shifted optical fiber 400 by drawing the preform, since the viscosity difference has been reduced in the vicinity of the interfaces of the outer core 412, drastic changes of internal stress are suppressed. As a result, structural irregularity and glass defect have effectively been suppressed in the vicinity of the interfaces of the outer core 412.

Though a depressed cladding structure is employed as the structure of the cladding region 420 in the fourth embodiment, this depressed cladding structure is also applicable to any of the above-mentioned first to third embodiments.

As explained in the foregoing, in accordance with the present invention, while the refractive index of the inner core is lowered with respect to the reference area of the cladding region, the refractive index of the outer core is enhanced with respect to the reference area of the cladding region, thereby viscosity difference can be reduced in the vicinity of interfaces of the outer core upon the drawing process, thus suppressing drastic changes of internal stress. Hence, it is effective in that structural irregularity and glass defect are effectively suppressed in the vicinity of the interfaces of the outer core. Further, since thermal expansion difference in the vicinity of interfaces between the individual regions has been reduced, no problem regarding to the generation of cracking or the like in the optical fiber preform has occurred in the process of making the optical fiber preform.

Also, in accordance with the present invention, in the outer core, the outer portion adjacent to the cladding region is doped with an impurity for lowering the viscosity of the outer core upon melting, and the contents of this impurity is distributed such as to alleviate the viscosity changes in the vicinity of the interfaces of the outer core, thereby it is effective in that the occurrence of structural irregularity and glass defect at the time of fiber drawing is reduced, and that drastic thermal expansion in the outer core is suppressed.

Further, since structural defects such as occurrence of structural irregularity and glass defect in the vicinity of interfaces of the outer core are effectively restrained, the present invention is effective in that a dispersion-shifted optical fiber suitable for WDM transmission and less likely to generate nonlinear phenomena is obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion-shifted optical fiber comprising a core region extending along a predetermined axis, and a cladding region provided on the outer periphery of said core region, said core region comprising:

an inner core whose relative refractive index difference with respect to a reference area of said cladding region is higher in its peripheral portion than in its center portion; and an outer core including, at least, an inner portion provided on the outer periphery of said inner core, and an outer portion provided between said inner portion and said cladding region, the relative refractive index difference of said inner portion with respect to the reference area of said cladding region increasing from the center of said dispersion-shifted optical fiber toward the periphery thereof, the relative refractive index difference of said outer portion with respect to the reference area of said cladding region decreasing from the center of said dispersion-shifted optical fiber toward the periphery thereof, wherein, in the outer portion of said outer core, the ratio of amounts of change of the relative refractive index difference in a radial direction with respect to the thickness of said outer portion in said radial direction is not greater than $1.0\%/\mu m$.

2. A dispersion-shifted optical fiber according to claim 1, wherein the difference between the maximum value of relative refractive index difference in said outer core with respect to the reference area of said cladding region and the minimum value of relative refractive index difference in said inner core with respect to the reference area of said cladding region is 1.0% or more.

3. A dispersion-shifted optical fiber according to claim 1, wherein the maximum value of relative refractive index difference in said outer core with respect to the reference area of said cladding region coincides with the maximum value of relative refractive index difference in said dispersion-shifted optical fiber with respect to the reference area of said cladding region, and wherein the minimum value of relative refractive index difference in said inner core with respect to the reference area of said cladding region coincides with the minimum value of relative refractive index difference in said dispersion-shifted optical fiber with respect to the reference area of said cladding region.

4. A dispersion-shifted optical fiber according to claim 1, wherein, in at least one of the inner and outer portions of said outer core, the distribution of relative refractive index difference with respect to the reference area of said cladding region changes substantially stepwise along the radial direction of said dispersion-shifted optical fiber.

5. A dispersion-shifted optical fiber according to claim 1, wherein at least a part of said inner core contains at least fluorine, and wherein at least a part of said outer core contains germanium oxide.

6. A dispersion-shifted optical fiber according to claim 1, wherein said cladding region comprises:

an inner cladding provided on the outer periphery of said outer core, said inner cladding having a predetermined refractive index; and an outer cladding provided on the outer periphery of said inner cladding, said outer cladding having a higher refractive index than said inner cladding and acting as said reference area.

7. A dispersion-shifted optical fiber comprising a core region extending along a predetermined axis, and a cladding region provided on the outer periphery of said core region, said core region comprising:

an inner core whose relative refractive index difference with respect to a reference area of said cladding region is higher in its peripheral portion than in its center portion; and an outer core including, at least, an inner portion provided on the outer periphery of said inner core and an outer portion provided between said inner portion and said cladding region, the relative refractive index difference of said inner portion with respect to the reference area of said cladding region increasing from the center of said dispersion-shifted optical fiber toward the periphery thereof, the relative refractive index difference of said outer portion with respect to the reference area of said cladding region decreasing from the center of said dispersion-shifted optical fiber toward the periphery thereof, wherein at least the inner portion of said outer core contains a first dopant for increasing the refractive index, and wherein at least the outer portion of said outer core contains a second dopant for reducing the viscosity of said outer core upon melting.

8. A dispersion-shifted optical fiber according to claim 7, wherein the difference between the maximum value of relative refractive index difference in said outer core with respect to the reference area of said cladding region and the minimum value of relative refractive index difference in said inner core with respect to the reference area of said cladding region is 1.0% or more.

9. A dispersion-shifted optical fiber according to claim 7, wherein the maximum value of relative refractive index difference in said outer core with respect to the reference area of said cladding region coincides with the maximum value of relative refractive index difference in said dispersion-shifted optical fiber with respect to the reference area of said cladding region, and wherein the minimum value of relative refractive index difference in said inner core with respect to the reference area of said cladding region coincides with the minimum value of relative refractive index difference in said dispersion-shifted optical fiber with respect to the reference area of said cladding region.

10. A dispersion-shifted optical fiber according to claim 7, wherein, in at least one of the inner and outer portions of said outer core, the distribution of relative refractive index difference with respect to the reference area of said cladding region changes substantially stepwise along the radial direction of said dispersion-shifted optical fiber.

11. A dispersion-shifted optical fiber according to claim 7, wherein at least a part of said inner core contains at least fluorine, and wherein at least a part of said outer core contains germanium oxide.

12. A dispersion-shifted optical fiber according to claim 7, wherein said first dopant includes at least germanium oxide, and wherein said second dopant includes at least phosphorus.

13. A dispersion-shifted optical fiber according to claim 7, wherein, in said outer portion of said outer core, the contents of said second dopant decreases from the center of said dispersion-shifted optical fiber toward the periphery thereof.

14. A dispersion-shifted optical fiber according to claim 7, wherein said cladding region comprises:

an inner cladding provided on the outer periphery of said outer core, said inner cladding having a predetermined refractive index; and an outer cladding provided on the outer periphery of said inner cladding, said outer cladding having a higher refractive index than said inner cladding and acting as said reference area.

* * * * *